United States Patent
Wang (10) Patent No.: US 8,022,143 B2
(45) Date of Patent: Sep. 20, 2011

(54) CLOSURES FOR BOTTLES

(75) Inventor: XiaoChuan Wang, Calgary (CA)

(73) Assignee: Nova Chemicals (International) S.A (CH)

( * ) Notice: Subject to any disclaimer, the term of this patent is extended or adjusted under 35 U.S.C. 154(b) by 328 days.

(21) Appl. No.: 12/384,941

(22) Filed: Apr. 10, 2009

(65) Prior Publication Data

US 2010/0261848 A1    Oct. 14, 2010

(30) Foreign Application Priority Data

Apr. 21, 2008 (CA) .................................... 2629576

(51) Int. Cl.
*C08L 23/04* (2006.01)
*C08L 23/00* (2006.01)

(52) U.S. Cl. ........................................ 525/191; 525/240

(58) Field of Classification Search .................. 525/191, 525/240

See application file for complete search history.

(56) References Cited

U.S. PATENT DOCUMENTS

| | | |
|---|---|---|
| 3,645,992 A | 2/1972 | Elston |
| 4,798,081 A | 1/1989 | Hazlitt et al. |
| 5,055,438 A | 10/1991 | Canich |
| 5,064,802 A | 11/1991 | Stevens et al. |
| 5,292,845 A | 3/1994 | Kawasaki et al. |
| 5,324,800 A | 6/1994 | Welborn, Jr. et al. |
| 5,981,664 A | 11/1999 | Neumann et al. |
| 6,063,879 A | 5/2000 | Stephan et al. |
| 6,114,481 A | 9/2000 | McMeeking et al. |
| 6,372,864 B1 | 4/2002 | Brown |
| 6,689,847 B2 | 2/2004 | Mawson et al. |
| 6,806,338 B2 | 10/2004 | Baan et al. |
| 7,022,770 B2 | 4/2006 | Lustiger et al. |
| 7,396,878 B2 * | 7/2008 | Lustiger et al. ............... 525/191 |
| 7,790,826 B2 * | 9/2010 | Wilson et al. ................. 526/352 |
| 2005/0004315 A1 | 1/2005 | De Baudimont et al. |
| 2005/0267249 A1 | 12/2005 | Wilson et al. |
| 2006/0247373 A1 | 11/2006 | Goyal et al. |

FOREIGN PATENT DOCUMENTS

| | | |
|---|---|---|
| CA | 2656845 A1 | 11/2008 |
| WO | WO 00/71615 | 11/2000 |
| WO | WO 2005/121239 | 12/2005 |
| WO | WO 2006/048253 | 5/2006 |
| WO | WO 2006/048254 | 5/2006 |
| WO | WO 2006/048255 | 5/2006 |
| WO | WO 2006/048259 | 5/2006 |
| WO | WO 2007/060007 | 5/2007 |
| WO | WO 2007/130515 | 11/2007 |
| WO | WO 2008/136849 | 11/2008 |

OTHER PUBLICATIONS

J.C. Randall, Reviews in Macromolecular Chem. and Phy., J. Macro. Sci., (1989) vol. C29, 2 & 3 , pp. 285-297.

\* cited by examiner

*Primary Examiner* — Nathan M Nutter
(74) *Attorney, Agent, or Firm* — Kenneth H Johnson (57) ABSTRACT

A dual reactor solution process gives high density polyethylene compositions containing a first ethylene polymer and a second ethylene polymer which have a good balance of processability, toughness, and environmental stress crack resistance combined with good organoleptic properties. The polyethylene compositions are suitable for compression molding or injection molding applications and are particularly useful in the manufacture of caps and closures for bottles.

18 Claims, 2 Drawing Sheets

CLOSURES FOR BOTTLES

FIELD OF THE INVENTION

The present invention relates to polyethylene compositions that are useful in the manufacture of closures for bottles.

BACKGROUND OF THE INVENTION

Polymer compositions useful for molding applications, specifically the manufacture of caps and closures for bottles are well known. Screw closures for example, are typically made from polypropylene (PP) in order to achieve the necessary cap strength, however, an inner liner composed of a soft polymer is required to provide necessary seal properties. The soft inner liner can be made from ethylene/vinyl acetate (EVA), polyvinyl chloride (PVC), butyl rubber or other suitable material. The two-part cap is costly, and single part constructions are preferred to reduce cost.

Accordingly, one-piece closures, such as screw caps have more recently been made from polyethylene resins. The use of high density resin is required if the closures are to have sufficient stiffness, while broader molecular weight distributions are desirable to impart good flow properties and to improve environmental stress crack resistance (ESCR).

Polyethylene blends produced with conventional Ziegler-Natta or Phillips type catalysts systems can be made having suitably high density and ESCR properties, see for example, WO 00/71615 and U.S. Pat. No. 5,981,664. However, the use of conventional catalyst systems typically produces significant amounts of low molecular weight polymer chains having high comonomer contents, which results in resins having non-ideal organoleptic properties.

Examples of high density multimodal polyethylene blends made using conventional catalyst systems for the manufacture of caps or closures are taught in US 2005/0004315A1; US 2005/0267249A1; WO 2006/048254, WO 2006/048253 and WO 2007/060007.

In contrast to traditional catalysts, the use of so called single site catalysts (such as "metallocene" and "constrained geometry" catalysts) provides resin having lower catalyst residues and improved organoleptic properties as taught by U.S. Pat. Nos. 6,806,338 and 7,022,770. The disclosed resins are suitable for use in molded articles.

Despite the progress made in the field, there remains a need for new polyethylene resins having an improved balance of toughness, ESCR, processability, and organoleptic properties for use in the manufacture of caps and closures. We have now found that use of a single site catalyst system in a dual reactor solution process, provides bimodal polyethylene compositions of specific molecular weight distributions having good and balanced rheological and mechanical properties. The polyethylene compositions provided also have good organoleptic properties and are especially well suited to the manufacture of closures for bottles.

SUMMARY OF THE INVENTION

The present invention provides an improved polyethylene composition that can be used in caps and closures.

The present invention provides caps and closures comprising a polyethylene composition made by a two reactor solution phase process and a single site catalyst. Plaques made from the polyethylene compositions have an improved balance of rheological, processing and organoleptic properties relative to those made using transitional catalysts and processes.

The current invention provides a closure for bottles, containers and the like, comprising a bimodal polyethylene composition, said bimodal polyethylene composition comprising:

(1) 10 to 70 wt % of a first ethylene polymer having a melt index, $I_2$, of less than 0.4 g/10 min; a molecular weight distribution, $M_w/M_n$, of less than 3.0; a CDBI>50 and a density of from 0.932 to 0.955 g/cm$^3$;

(2) 90 to 30 wt % of a second ethylene polymer having a melt index, $I_2$, of from 20 to 1000 g/10 min; a molecular weight distribution, $M_w/M_n$, of less than 3.0; a CDBI>50 and a density higher than the density of said first ethylene polymer, but less than 0.962 g/cm$^3$;

wherein the density of said second ethylene polymer is less than 0.035 g/cm$^3$ higher than the density of said first ethylene polymer; and wherein said composition has a molecular weight distribution of from 3 to 7; a density of more than 0.949 g/cm$^3$; a melt index of from 0.4 to 3 g/10 min; and a comonomer content of less than 0.5 mol %.

Provided is a closure for bottles, containers and the like comprising a bimodal polyethylene composition, said polyethylene composition comprising:

(1) 20 to 60 wt % of a first ethylene polymer having a melt index, $I_2$, of less than 0.4 g/10 min; a molecular weight distribution, $M_w/M_n$, of less than 3.0; a CDBI>50 and a density of from 0.932 to 0.955 g/cm$^3$;

(2) 80 to 40 wt % of a second ethylene polymer having a melt index, $I_2$, of from 20 to 1000 g/10 min; a molecular weight distribution, $M_w/M_n$, of less than 3.0; a CDBI>50 and a density higher than the density of said first ethylene polymer, but less than 0.962 g/cm$^3$;

wherein the density of said second ethylene polymer is less than 0.035 g/cm$^3$ higher than the density of said first ethylene polymer; and wherein said composition has a molecular weight distribution of from 3 to 7; a density of more than 0.949 g/cm$^3$; a melt index of from 0.4 to 3 g/10 min; and a comonomer content of less than 0.5 mol %; and wherein said polyethylene composition is prepared by contacting ethylene and 1-octene under solution polymerization conditions in at least two polymerization reactors.

Provided is a polyethylene composition comprising:

(1) 20-60 wt % of a first ethylene polymer having a $M_w$ of at least 110000; a molecular weight distribution, $M_w/M_n$, of less than 2.5 and a density of from 0.932 to 0.955 g/cm$^3$; and (2) 80-40 wt % of a second ethylene polymer having a $M_w$ of at most 45000; a molecular weight distribution, $M_w/M_n$, of less than 2.5 and a density higher than the density of said first ethylene polymer, but less than 0.962 g/cm$^3$;

wherein the density of said second ethylene polymer is less than 0.035 g/cm$^3$ higher than the density of said first ethylene polymer; and wherein said composition has a hexane extractables level of less than 0.55 wt %; a shear viscosity at $10^4$ s$^{-1}$ (230° C.) of less than 50 (Pa·s) and satisfies the equations:

a) the ratio of $I_2$ of the second ethylene polymer/$I_2$ of the first ethylene polymer>50/1; and b) the ratio of $I_2$ of the second ethylene polymer/$I_2$ of the composition is from 6 to 2500.

A process is provided to prepare a bimodal polyethylene composition, wherein the composition comprises:

(1) 20 to 60 wt % of a first ethylene polymer having a melt index, $I_2$, of less than 0.4 g/10 min; a molecular weight distribution, $M_w/M_n$, of less than 3.0; a CDBI>50 and a density of from 0.932 to 0.955 g/cm$^3$; and (2) 80 to 40 wt % of a second ethylene polymer having a melt index, $I_2$, of from 20 to 1000 g/10 min; a molecular weight distribution, $M_w/M_n$, of less than 3.0; a CDBI>50 and a density higher than the density of said first ethylene polymer, but less than 0.962 g/cm$^3$;

wherein the density of said second ethylene polymer is less than 0.035 g/cm$^3$ higher than the density of said first ethylene polymer; and wherein said composition has a molecular weight distribution of from 3 to 7; a density of more than 0.949 g/cm$^3$; a melt index of from 0.4 to 3 g/10 min and a comonomer content of less than 0.5 mol %; and said process comprising contacting at least one single site polymerization catalyst system with ethylene and at least one comonomer under solution polymerization conditions in at least two polymerization reactors.

DETAILED DESCRIPTION

The present invention is related to caps and closures for bottles and to the polyethylene compositions used to manufacture them. The polyethylene compositions are composed of at least two ethylene copolymer components: a first ethylene polymer and a second ethylene polymer. The polyethylene compositions of the invention have a good balance of processability, toughness, stiffness, environmental stress crack resistance, and organoleptic properties making them ideal materials for use in manufacturing caps and closures for bottles.

The terms "cap" and "closure" are used interchangeably in the current invention, and both connote any suitably shaped molded article for enclosing, sealing, closing or covering etc., a suitably shaped opening, a suitably molded aperture, an open necked structure or the like used in combination with a container, a bottle, a jar and the like.

The term "homogeneous" or "homogeneously branched polymer" as used herein is defined in U.S. Pat. No. 3,645,992. Accordingly, homogeneously branched polyethylene is a polymer that has a narrow composition distribution. That is, the comonomer is randomly distributed within a given polymer chain and substantially all of the polymer chains have same ethylene/comonomer ratio. The composition distribution of a polymer can be characterized by the short chain distribution index (SCDI) or composition distribution breadth index (CDBI). The CDBI is defined as the weight per cent of the polymer molecules having a comonomer content within 50 per cent of the median total molar comonomer content. The CDBI is determined using techniques well known in the art, particularly temperature rising elution fractionation (TREF) as described in Wild et al. *Journal of Polymer Science, Pol. Phys. Ed. Vol* 20, p 441 (1982) or in U.S. Pat. No. 4,798,081.

The First Ethylene Polymer

In an aspect of the invention, the first ethylene polymer of the polyethylene composition of the current invention is a homogeneous ethylene copolymer having a density of from about 0.932 g/cm$^3$ to about 0.955 g/cm$^3$; a melt index, $I_2$, of less than about 0.4 g/10 min; a molecular weight distribution, $M_w/M_n$, of below about 3.0 and a weight average molecular weight, $M_w$, that is greater than the $M_w$ of the second ethylene polymer. Preferably, the weight average molecular weight of the first ethylene polymer is at least 110000.

The density of the first ethylene polymer may be measured according to ASTM D792. The melt index, $I_2$, of the first ethylene polymer fraction may be measured according to ASTM D1238 (when conducted at 190° C., using a 2.16 kg weight).

The density and the melt index, $I_2$, of the first ethylene polymer can optionally be estimated from GPC-FTIR experiments and deconvolutions carried out on a bimodal polyethylene composition (see experimental section).

In another aspect of the invention, the first ethylene polymer of the polyethylene composition is a homogeneous ethylene copolymer having a weight average molecular weight, $M_w$, of at least 110000; a molecular weight distribution, $M_w/M_n$, of less than 2.5 and a density of from 0.932 to 0.955 g/cm$^3$.

In the present invention, the first ethylene polymer is homogeneously branched ethylene copolymer and can have a CDBI of greater than about 30%, more preferably of greater than about 50%.

The first ethylene polymer can comprise between 10 and 70 weight percent (wt %) of the polyethylene composition, based on the total weight of the first and second ethylene polymers.

The comonomer content in the first ethylene polymer can be from about 0.01 to about 0.25 mol % as measured by NMR, or FTIR or GPC-FTIR methods. The comonomer content of the first ethylene polymer can also be determined by mathematical deconvolution methods applied to a bimodal polyethylene composition (see experimental section). The comonomer is one or more suitable alpha olefin such as but not limited to 1-butene, 1-hexene, 1-octene and the like, with 1-octene being preferred.

The Second Ethylene Polymer

In an aspect of the invention, the second ethylene polymer of the polyethylene composition of the current invention is a homogeneous ethylene copolymer having a density below 0.962 g/cm$^3$ but which is higher than the density of the first ethylene polymer; a melt index, $I_2$, of from about 20 to 1000 g/10 min.; a molecular weight distribution, $M_w/M_n$, of below about 3.0 and a number average molecular weight that is less than the $M_w$ of the first ethylene. Preferably, the weight average molecular weight, $M_w$, will be below 45,000.

The density of the second ethylene polymer may be measured according to ASTM D792. The melt index, $I_2$, of the second ethylene polymer may be measured according to ASTM D1238 (when conducted at 190° C., using a 2.16 kg weight).

The density and the melt index, $I_2$, of the second ethylene polymer can optionally be estimated from GPC-FTIR experiments and deconvolutions carried out on a bimodal polyethylene composition.

In another aspect of the invention, the second ethylene polymer of the polyethylene composition is a homogeneous ethylene copolymer having a weight average molecular weight, $M_w$, of at most 45000; a molecular weight distribution, $M_w/M_n$, of less than 2.5 and a density higher than the density of said first ethylene polymer, but less than 0.962 g/cm$^3$.

In the present invention, the second ethylene polymer is homogeneously branched ethylene copolymer and can have a CDBI of greater than about 30%, more preferably of greater than about 50%.

The second ethylene polymer can comprise between 90 and 30 wt % of the polyethylene composition, based on the total weight of the first and second ethylene polymers.

The comonomer content in the second ethylene polymer can be from about 0.01 to about 3 mol % as measured by NMR, or FTIR or GPC-FTIR methods. The comonomer content of the second ethylene polymer can also be determined by mathematical deconvolution methods applied to a bimodal polyethylene composition. The comonomer is one or more suitable alpha olefin such as but not limited to 1-butene, 1-hexene, 1-octene and the like, with the use of 1-octene being preferred.

In an aspect of the invention the second ethylene polymer has a density that is within about 0.035 g/cm$^3$ higher than the density of the first ethylene polymer.

In an aspect of the invention, the $I_2$ of the second ethylene polymer is at least 10 times, preferably more than 25 times, the $I_2$ of the first ethylene polymer.

The Polyethylene Composition

The polyethylene composition of this invention has a broad, bimodal or multimodal molecular weight distribution. Minimally, the polyethylene composition will contain a first ethylene polymer and a second ethylene polymer.

In a specific aspect of the invention, the polyethylene composition is bimodal. In the current invention, the term "bimodal" means that the polyethylene composition comprises at least two components, one of which has a lower molecular weight and a higher density and another of which has a higher molecular weight and a lower density. Typically, a bimodal or multimodal polyethylene composition can be identified by using gel permeation chromatography (GPC). Generally, the GPC chromatograph will exhibit two or more component ethylene polymers, where the number of component ethylene polymers corresponds to the number of discernible peaks. One or more component ethylene polymers may also exist as a hump, shoulder or tail relative to the molecular weight distribution of the other ethylene polymer component.

The polyethylene composition of the current invention has at least the following characteristics: a density of greater than or equal to 0.949 g/cm$^3$, as measured according to ASTM D792; a melt index, $I_2$, of from about 0.4 to about 5 g/10 min, as measured according to ASTM D1238 (when conducted at 190° C., using a 2.16 kg weight); a molecular weight distribution, $M_w/M_n$, of from about 3 to about 9 and a comonomer content of less than 0.55 mol % as measured by FTIR or $^{13}$C NMR methods, where the comonomer is one or more suitable alpha olefins such as but not limited to 1-butene, 1-hexene, 1-octene and the like, with 1-octene being preferred. Alternatively, the polyethylene composition of the current invention has at least the following characteristics: a hexane extractables level of less than 0.55 wt %; a shear viscosity at $10^4$ s$^{-1}$ (230° C.) of less than 50 (Pa·s) and satisfies the equations: a) the ratio of $I_2$ of the second ethylene polymer/$I_2$ of the first ethylene polymer>50/1; and b) the ratio of $I_2$ of the second ethylene polymer/$I_2$ of the polyethylene composition is from 6 to 2500.

In an aspect of the invention, the polyethylene composition has a melt index, $I_5$, of greater than about 1.1 g/10 min, as measured according to ASTM D1238 (when conducted at 190° C., using a 5 kg weight).

In an aspect of the invention, the polyethylene composition has a number average molecular weight, $M_n$, of below about 30,000.

In an aspect of the invention, the polyethylene composition has a melt flow ratio (MFR$_2$) defined as $I_{21}/I_2$ of from 20 to 70.

In an aspect of the invention, the polyethylene composition has a melt flow (MFR$_5$) defined as $I_{21}/I_5$ of less than 20.

In an aspect of the invention the polyethylene composition has a shear viscosity at $10^4$ s$^{-1}$ (230° C.) of less than about 60 (Pa·s); and hexane extractables of below 0.55 wt %.

In an aspect of the invention, the polyethylene composition has a melt index, $I_2$, of between 0.4 and 3 g/10 min. In another aspect of the invention, the polyethylene composition has a melt index, $I_2$, of less than 2 g/10 min.

In an aspect of the invention, the polyethylene composition has a MWD of between 4 and 7.

In an aspect of the invention, the polyethylene composition has at least one type of alpha-olefin that has at least 4 carbon atoms and its content is less than 0.5 mol % as determined by $^{13}$C NMR.

In an aspect of the invention, the shear viscosity ratio, SVR$_{(10, 1000)}$ at 230° C. of the polyethylene composition can be from about 5 to 25, preferably, 6 to 20. The shear viscosity ratio SVR$_{(10, 1000)}$ is determined by taking the ratio of shear viscosity at shear rate of 10 s$^{-1}$ and shear viscosity at shear rate of 1000 s$^{-1}$ as measured with a capillary rheometer at constant temperature (e.g. 230° C.), and a die with L/D ratio of 20 and diameter of 0.06".

In an aspect of the invention, the shear thinning index, SHI$_{(1, 100)}$ of the polyethylene composition is less than about 10; in another aspect the SHI$_{(1, 100)}$ will be less than about 7. The shear thinning index (SHI), was calculated using dynamic mechanical analysis (DMA) frequency sweep methods as disclosed in PCT applications WO 2006/048253 and WO 2006/048254.

The SHI value is obtained by calculating the complex viscosities eta(1) and eta(100) at a constant shear stress of 1 kPa and 100 kPa, respectively.

In an aspect of the invention, the SHI$_{(1, 100)}$ of the polyethylene composition satisfies the equation: SHI$_{(1, 100)}$<−10.58 log($I_2$) of polyethylene composition)+12.94. In another aspect of the invention, the SHI$_{(1, 100)}$ of the polyethylene composition satisfies the equation:

$$SHI_{(1, 100)} < -5.5 \log(I_2 \text{ of polyethylene composition}) + 9.66.$$

In an aspect of the invention, the $I_2$ of the second ethylene polymer will be less than 200 times the $I_5$ of the polyethylene composition.

In an aspect of the invention, a molded article made from the polyethylene composition, has an environment stress crack resistance (ESCR) A10 of at least 20 hrs as measured according to ASTM D1693 (at 10% Igepal and 50° C. under condition A).

In an aspect of the invention, a molded article made from the polyethylene composition has an Izod impact strength of at least 50 kJ/m, as measured according to ASTM D256; a melt index, $I_2$, of from 1 to 3 g/10 min and a molecular weight distribution of from 5 to 8.

In another aspect of the invention, a molded article made from the polyethylene composition has a notched Izod impact strength of at least 100 kJ/m, as measured according to ASTM D256; a melt index, $I_2$, of from 0.4 to 1 g/10 min; and a molecular weight distribution of from 3 to 6.

In an aspect of the invention the polyethylene composition of the current invention has a density of between 0.950 and 0.953 g/cm$^3$; a melt index, $I_2$, of from 0.4 to 1 g/10 min; a molecular weight distribution of from 3 to 6; a number average molecular weight, $M_n$, of below 30,000; a shear viscosity at $10^4 \text{ s}^{-1}$ (230° C.) of less than 50 (Pa·s) and hexane extractables of less than 0.55% and a molded article made there from has a notched Izod impact strength of more than 100 kJ/m and an A10 ESCR of at least 20 hrs.

In another aspect of the invention the polyethylene composition of the current invention has a density of between 0.950 and 0.953 g/cm³; a melt index, $I_2$, of from 1 to 3 g/10 min; a molecular weight distribution of from 5 to 8; a number average molecular weight, $M_n$, of below 30,000; a shear viscosity at $10^4 \text{ s}^{-1}$ (230° C.) of less than 45 (Pa·s) and hexane extractables of less than 0.55% and a molded article made there from has an Izod impact strength of more than 60 kJ/m and an ESCR of at least 20 hrs.

The polyethylene composition of this invention can be made using any conventional blending method such as but not limited to physical blending and in-situ blending by polymerization in multi reactor systems. For example, it is possible to perform the mixing of the first ethylene polymer with the second ethylene polymer by molten mixing of the two preformed polymers. Preferred are processes in which the first and second ethylene polymers are prepared in at least two sequential polymerization stages, however, both in-series or an in-parallel dual reactor process are contemplated for use in the current invention. Gas phase, slurry phase or solution phase reactor systems may be used, with solution phase reactor systems being preferred.

In an aspect of the current invention, a dual reactor solution process is used as has been described in for example U.S. Pat. No. 6,372,864 and U.S. app. No. 20060247373A1 which are incorporated herein by reference.

The homogeneously branched ethylene polymers can be prepared using any catalyst capable of producing homogeneous branching. Generally, the catalysts will be based on a group 4 metal having at least one cyclopentadienyl ligand that is well known in the art. Examples of such catalysts which include metallocenes, constrained geometry catalysts and phosphinimide catalysts are typically used in combination with methylaluminoxanes, boranes or ionic borate salts and are further described in U.S. Pat. Nos. 3,645,992; 5,324,800; 5,064,802; 5,055,438; 6,689,847; 6,114,481 and 6,063,879. Such catalysts may also be referred to as "single site catalysts" to distinguish them from traditional Ziegler-Natta or Phillips catalysts which are also well known in the art. In general single site catalysts produce ethylene copolymers having a molecular weight distribution ($M_w/M_n$) of less than about 2.5 and a composition distribution breadth index (CDBI) of greater than about 30%, preferably greater than 50%.

In an aspect of the current invention, homogeneously branched ethylene polymers are prepared using an organometallic complex of a group 3, 4 or 5 metal that is further characterized as having a phosphinimide ligand.

In an aspect of the invention, use of a single site catalyst that does not produce long chain branching (LCB) is preferred. Without wishing to be bound by any single theory, long chain branching can increase viscosity at low shear rates, thereby negatively impacting cycle times during the manufacture of caps and closures, such during the process of compression molding. Long chain branching is determined using $^{13}$C NMR methods and can be quantitatively assessed using the method disclosed by Randall in Rev. Macromol. Chem. Phys. C29 (2 and 3), p. 285.

In an aspect of the invention, the polyethylene composition will contain fewer than 0.3 long chain branches per 100 carbon atoms. In another aspect of the invention, the polyethylene composition will contain fewer than 0.01 long chain branches per 1000 carbon atoms.

In an aspect of this invention a group IV phosphinimide catalyst system is used in a solution phase dual reactor system to prepare a bimodal polyethylene composition by polymerization of ethylene in the presence of 1-octene.

The production of the polyethylene composition of the present invention will typically include an extrusion or compounding step. Such steps are well known in the art.

The polyethylene composition can comprise further polymer components in addition to the first and second ethylene polymers. Such polymer components include polymers made in situ or polymers added to the polymer composition during an extrusion or compounding step.

Optionally, additives can be added to the polyethylene composition. Additives can be added to the polyethylene composition during an extrusion or compounding step, but other suitable known methods will be apparent to a person skilled in the art. The additives can be added as is or as part of a separate polymer component (i.e. not the first or second ethylene polymers described above) added during an extrusion or compounding step. Suitable additives are known in the art and include but are not-limited to antioxidants, phosphites and phosphonites, nitrones, antacids, UV light stabilizers, UV absorbers, metal deactivators, dyes, fillers and reinforcing agents, nano-scale organic or inorganic materials, antistatic agents, lubricating agents such as calcium stearates, slip additives such as erucimide, and nucleating agents. The additives that can be optionally added are typically added in amount of up to 20 weight percent (wt %).

In an aspect of the invention, the polymer compositions described above are used in the formation of molded articles. For example, articles formed by compression molding and injection molding are contemplated. Such articles include, for example, caps (i.e. screw caps) and closures for bottles. However, a person skilled in the art will readily appreciate that the compositions described above may also be used for other applications such as but not limited to film, blow molding and sheet extrusion applications.

The closures of the current invention can be made according to any known method, including for example injection molding and compression molding techniques that are well known to persons skilled in the art.

The closures of the invention comprise the polyethylene composition described above and have good organoleptic properties, good toughness, as well as good ESCR values. Hence the closures and caps of the current invention are well suited for sealing bottles containing drinkable water, soft drinks and other foodstuffs, including but not limited to liquids that are under pressure (i.e. carbonated beverages).

The invention is further illustrated by the following non-limiting examples.

EXAMPLES $M_n$, $M_w$, and $M_z$ (g/mol) were determined by high temperature Gel Permeation Chromatography with differential refractive index detection using universal calibration (e.g. ASTM-D6474-99). The molecular weight distribution (MWD) is the weight average molecular weight divided by the number average molecular weight, $M_w/M_n$.

Primary melting peak (° C.), heat of fusion (J/g) and crystallinity (%) was determined using differential scanning calorimetry (DSC) as follows: the instrument was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The DSC Tm, heat of fusion and crystallinity are reported from the $2^{nd}$ heating cycle.

The short chain branch frequency (SCB per 1000 carbon atoms) of copolymer samples was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

Comonomer content can also be measured using $^{13}C$ NMR techniques as discussed in Randall, Rev. Macromol. Chem. Phys., C29 (2&3), p 285; U.S. Pat. No. 5,292,845 and WO 2005/121239.

Polyethylene composition density (g/cm$^3$) was measured according to ASTM D792.

Hexane extractables were determined according to ASTM D5227.

Shear viscosity was measured by using a Kayeness WinKARS Capillary Rheometer (model #D5052M-115). The die has a die diameter of 0.06 inch and L/D ratio of 20 and an entrance angle of 180 degrees.

Melt indexes, $I_2$, $I_6$ and $I_{21}$ for the polyethylene composition were measured according to ASTM D1238 (when conducted at 190° C., using a 2.16 kg, a 6.48 kg and a 21 kg weight respectively). The melt index, $I_5$, was calculated using the equation: $(5/6.48) \times I_6$ or $0.7716 \times I_6$. The melt index, $I_2$ and density of the first and second ethylene polymers were estimated by GPC-FTIR deconvolution experiments as discussed below.

High temperature GPC equipped with an online FTIR detector (GPC-FTIR) was used to measure the comonomer content as the function of molecular weight. Mathematical deconvolutions are performed to determine the relative amount of polymer, molecular weight and comonomer content of the component made in each reactor, by assuming that each polymer component follows a Flory's molecular weight distribution function and it has a homogeneous comonomer distribution across the whole molecular weight range.

For these SSC catalyzed resins, the GPC data from GPC-FTIR chromatographs was fit based on Flory's molecular weight distribution function.

To improve the deconvolution accuracy and consistency, as a constraint, the melt index, $I_2$, of the targeted resin was set and the following relationship was satisfied during the deconvolution:

$$Log_{10}(I_2)=22.326528+0.003467*[Log_{10}(M_n)]^3-4.322582*Log_{10}(M_w)-0.180061*[Log_{10}(M_z)]^2+0.026478*[Log_{10}(M_z)]^3$$

where the experimentally measured overall melt index, $I_2$, was used on the left side of the equation, while $M_n$ of each component ($M_w=2\times M_n$ and $M_z=1.5\times M_w$ for each component) was adjusted to change the calculated overall $M_n$, $M_w$ and $M_z$ of the composition until the fitting criteria were met. During the deconvolution, the overall $M_n$, $M_w$ and $M_z$ are calculated with the following relationships: $M_n=1/Sum(w_i/M_n(i))$, $M_w=Sum(w_i \times M_w(i))$, $M_z=Sum(w_i \times M_z(i)^2)$, where i represents the i-th component and $w_i$ represents the relative weight fraction of the i-th component in the composition.

The uniform comonomer distribution (which results from the use of a single site catalyst) of the resin components allowed the estimation of the short chain branching content (SCB), in branches per 1000 carbon atoms and calculation of comonomer content (in mol %) and density (in g/cm$^3$) for the first and second ethylene polymers, based on the deconvoluted relative amounts of first and second ethylene polymer components in the polyethylene composition, and their estimated resin molecular weight parameters from the above procedure.

A component (or composition) density model and a component (or composition) melt index, $I_2$, model was used according to the following equations to calculate the density and melt index of the first and second ethylene polymers:

$$density=0.979863-0.00594808*(FTIR \; SCB/1000C)^{0.65}-0.000383133*[Log_{10}(M_n)]^3-0.00000577986*(M_w/M_n)^3+0.00557395*(M_z/M_w)^{0.25}$$

$$Log_{10}(melt \; index, I_2)=22.326528+0.003467*[Log_{10}(M_n)]^3-4.322582*Log_{10}(M_w)-0.180061*[Log_{10}(M_z)]^2+0.026478*[Log_{10}(M_z)]^3$$

where the $M_n$, $M_w$ and $M_z$ were the deconvoluted values of the individual ethylene polymer components, as obtained from the results of the above GPC deconvolution. Hence, these two models were used to estimate the melt indexes (except for that of the overall composition, where the model is used as a constraint) and the densities of the components and the composition.

Plaques molded from the polyethylene compositions were tested according to the following ASTM methods: Bent Strip Environmental Stress Crack Resistance (ESCR), ASTM D1693; notched Izod impact properties, ASTM D256; Flexural Properties, ASTM D 790; Tensile properties, ASTM D 638; Vicat softening point, ASTM D 1525; Heat deflection temperature, ASTM D 648; Shore D hardness, ASTM D 2240.

Examples of the bimodal polyethylene compositions were produced in a dual reactor solution polymerization process in which the contents of the first reactor flow into the second reactor. This "dual reactor" process produces an "in-situ" polyethylene blend (i.e. the polyethylene composition). Each reactor is sufficiently agitated to give conditions in which components are well mixed. The volume of the first reactor was 12 liters and the volume of the second reactor was 24 liters. These are the pilot plant scales. The first reactor was operated at a pressure of 10500 to 35000 kPa and the second reactor was operated at a lower pressure to facilitate continuous flow from the first reactor to the second. The solvent employed was methylpentane. The process operates using continuous feed streams. The catalyst employed in the dual reactor solution process experiments was a titanium complex having a phosphinimide ligand, a cyclopentadienide ligand and two activatable ligands, such as but not limited to chloride ligands. A boron based co-catalyst was used in approximately stoichiometric amounts relative to the titanium complex. Commercially available methylaluminoxane (MAO) was included as a scavenger at an Al:Ti of about 40:1. In addition, 2,6-di-tert-butylhydroxy-4-ethylbenzene was added to scavenge free trimethylaluminum within the MAO in a ratio of Al:OH of about 0.5:1.

The polymerization conditions are provided in Table 1. The resulting polyethylene compositions are described in Table 2. Estimated properties for the first ethylene polymer and the second ethylene polymer as obtained from GPC-FTIR deconvolution studies are provided in Table 3. The properties of pressed plaques made from the polyethylene compositions are provided in Table 4. Commercially available resin from INEOS, Eltex B4020N1331 is included in Tables 2 and 4 for comparison purposes. Eltex B4020N1331 is a uni-modal, ZN butene copolymer used widely in the cap industry.

TABLE 1

Reactor Conditions

| | Experiment | | | |
|---|---|---|---|---|
| | 1 | 2 | 3 | 4 |
| | Polyethylene Composition | | | |
| | PS 78292 | PS 78278 | PS 78483 | PS 78302 |
| Reactor 1 | | | | |
| Ethylene (kg/h) | 38.1 | 39.2 | 39.2 | 39.7 |
| Octene (kg/h) | 4.2 | 2.1 | 2.6 | 1.4 |
| Hydrogen (g/h) | 0.54 | 0.79 | 0.34 | 0.44 |
| Solvent (kg/h) | 302.3 | 314.2 | 313.7 | 319.7 |
| Reactor Feed Inlet Temperature (° C.) | 30 | 30 | 30 | 30 |
| Reactor Temperature (° C.) | 149.3 | 149.3 | 148.2 | 149.7 |
| Titanium Catalyst (ppm) | 0.06 | 0.04 | 0.04 | 0.04 |

TABLE 1-continued

Reactor Conditions

| | Experiment | | | |
|---|---|---|---|---|
| | 1 | 2 | 3 | 4 |
| | Polyethylene Composition | | | |
| | PS 78292 | PS 78278 | PS 78483 | PS 78302 |
| Reactor 2 | | | | |
| Ethylene (kg/h) | 50.3 | 47.9 | 47.6 | 48.5 |
| Octene (kg/h) | 5.5 | 2.6 | 3.2 | 1.7 |
| Hydrogen (g/h) | 24.72 | 12 | 18 | 7.26 |
| Solvent (kg/h) | 163 | 109.3 | 106.5 | 103.6 |
| Reactor Feed Inlet Temperature (° C.) | 30 | 29.7 | 30.5 | 30 |
| Reactor Temperature (° C.) | 200.3 | 209.9 | 210 | 210.4 |
| Titanium Catalyst (ppm) | 1.10 | 1.10 | 1.10 | 1.10 |

TABLE 2

Resin Properties

| | Comparative Example 1 | Comparative Example 2 | Inventive Composition 1 | Comparative Example 3 | Inventive Composition 2 |
|---|---|---|---|---|---|
| Polyethylene Composition | unimodal, N1331 | PS 78292 | PS-78278 | PS-78483 | PS-78302 |
| Density (g/cm$^3$) | 0.9533 | 0.952 | 0.9534 | 0.953 | 0.9523 |
| Molecular weight profile | unimodal | bimodal | bimodal | bimodal | bimodal |
| Melt Index I$_2$ (g/10 min) | 2.45 | 1.92 | 1.88 | 0.68 | 0.625 |
| Melt Flow Ratio (I$_{21}$/I$_2$) | 32.5 | 77.1 | 56.9 | 73.2 | 51.2 |
| Shear Viscosity at 10$^4$ s$^{-1}$ (230° C., Pa-s) | 45.9 | 26.6 | 37.3 | 35.50 | 43.60 |
| Zero Shear Viscosity, 190° C. (Pa-s) | 6193 | 5582 | 5896.0 | 14360 | 17250 |
| Shear Viscosity Ratio, 200° C. | 7.42 | 17.56 | 13.14 | 24.89 | 19.0 |
| Shear Viscosity Ratio, 230° C. | 6.3 | 14.21 | 11.58 | | 17.0 |
| Shear Viscosity Ratio, 250° C. | 6.11 | 12.62 | 9.79 | 20.23 | 15.56 |
| $M_n$ | 23548 | 9891 | 14393 | 12424 | 22392 |
| $M_w$ | 89571 | 77319 | 91663 | 104353 | 109626 |
| $M_z$ | 319120 | 245479 | 325841 | 327007 | 299470 |
| Polydispersity Index ($M_w/M_n$) | 3.8 | 7.82 | 6.37 | 8.4 | 4.9 |
| Comonomer content (mol %) by FTIR | <0.1 | 0.7 | 0.4 | 0.5 | 0.4 |
| Comonomer type | butene | Octene | octene | octene | octene |
| Comonomer content (mol %) by $^{13}$C NMR; for comonomer with ≧4 carbon atoms | | | 0.3 | | 0.2 |
| SCB per 1000 carbon atoms by FTIR | <0.5 | 3.7 | 2.2 | 2.5 | 2 |
| Primary Melting Peak (° C.) | 130.35 | 126.8 | 128.3 | 128.42 | 129.7 |
| Heat of Fusion (J/g) | 206.3 | 200.3 | 204.7 | 213.80 | 198.2 |
| Crystallinity (%) | 71.14 | 69.08 | 70.58 | 73.72 | 68.34 |
| Hexane Extractables (%) | 0.35 | 0.73 | 0.44 | 0.57 | 0.46 |
| VICAT Soft. Pt. (° C.) - Plaque | 127 | 122 | 126 | 125 | 127 |
| Shore D Hardness - Plaque | 68.5 | 67.1 | 68 | 67.2 | 67.9 |
| Cold Brittleness Temp. (−70° C.) - Plaque | pass at −70 C. | pass at −70 C. | pass at −70 C. | pass at −70 C. | pass at −70 C. |
| Heat Deflection Temp. [C.] @ 66 PSI | 72 | 68 | 72 | 71 | 71 |

TABLE 3

| Polyethylene Component Properties | | | | |
|---|---|---|---|---|
| | Polyethylene Composition | | | |
| | PS 78292 (Comparative) | PS-78278 (Inventive) | PS-78483 (Comparative) | PS-78302 (Inventive) |
| First Ethylene Polymer | | | | |
| Wt % | 0.43 | 0.43 | 0.45 | 0.43 |
| $M_w$ | 169500 | 162400 | 213200 | 214300 |
| melt index, $I_2$ (g/10 min.) | 0.11 | 0.13 | 0.05 | 0.05 |
| density 1 (g/cm$^3$) | 0.9382 | 0.9389 | 0.9363 | 0.9356 |
| Short chain branches per 1000 Cs | 0.18 | 0.15 | 0.06 | 0.13 |
| Second Ethylene Polymer | | | | |
| Wt % | 0.57 | 0.57 | 0.55 | 0.57 |
| $M_w$ | 11700 | 18500 | 14300 | 25600 |
| melt index, $I_2$ (g/10 min.) | 5082 | 736 | 2148 | 190 |
| density 2 (g/cm$^3$) | 0.9559 | 0.9559 | 0.9565 | 0.9522 |
| Short chain branches per 1000 Cs | 2.1 | 1.06 | 1.42 | 1.37 |
| Estimated (d2 − d1), g/cm$^3$ | 0.0177 | 0.017 | 0.0202 | 0.0166 |
| Estimated (SCB2 − SCB1)/1000 C | 1.92 | 0.91 | 1.36 | 1.24 |

TABLE 4

| Plaque Properties | | | | | |
|---|---|---|---|---|---|
| | Polyethylene Composition | | | | |
| | N1331 (Comparative) | PS 78292 (Comparative) | PS-78278 (Inventive) | PS-78483 (Comparative) | PS-78302 (Inventive) |
| ESCR Cond. A at 10% (hrs) | <23 | <24 | <24 | 64.5 | 40 |
| ESCR Cond. A at 100% (hrs) | <23 | 75 < F50 < 139 | <24 | 324.1 | 68.4 |
| ESCR Cond. B at 10% (hrs) | <24 | <24 | <24 | <24 | <24 |
| ESCR Cond. B at 100% (hrs) | <24 | 184.1 | 28.1 | 318.8 | 76.3 |
| Flexural Properties (Plaques) | | | | | |
| Flex Secant Mod. 1% (MPa) | 1298 | 1062 | 1035 | 1201 | 1070 |
| Flex Sec Mod 1% (MPa) Dev. | 39 | 34 | 25 | 41 | 37 |
| Flex Secant Mod. 2% (MPa) | 1083 | 904 | 877 | 1002 | 906 |
| Flex Sec Mod 2% (MPa) Dev. | 24 | 28 | 19 | 32 | 29 |
| Tensile Properties (Plaques) | | | | | |
| Yield Strength (MPa) | 27.7 | 25.7 | 26.6 | 26.9 | 25.4 |
| Yield Strength Dev. (MPa) | 0.2 | 0.6 | 0.3 | 0.3 | 0.4 |
| Elong. at Yield (%) | 10.1 | 10.3 | 10.2 | 10.2 | 10.3 |
| Elong. at Yield Dev. (%) | 0.6 | 0.3 | 0.8 | 0.4 | 1 |
| Ultimate Strength (MPa) | 33.2 | 14.8 | 21.5 | 800 | 1003 |
| Ultimate Strength Dev. (MPa) | 0.6 | 0.7 | 4.1 | 86.1 | 23.7 |
| Sec Mod 1% (MPa) | 1413 | 1244 | 1374 | 1237 | 1138 |
| Sec Mod 1% (MPa) Dev. | 182.5 | 47.1 | 276.4 | 83 | 210.8 |
| Sec Mod 2% (MPa) | 949 | 858 | 937 | 888 | 834 |

TABLE 4-continued

Plaque Properties

| | Polyethylene Composition | | | | |
|---|---|---|---|---|---|
| | N1331 (Comparative) | PS 78292 (Comparative) | PS-78278 (Inventive) | PS-78483 (Comparative) | PS-78302 (Inventive) |
| Sec Mod 2% (MPa) Dev. | 38.9 | 24 | 71 | 47 | 61 |
| Ultimate Elong. (%) | 1407 | 535 | 920 | 800 | 1003 |
| Ultimate Elong. Dev. (%) | 40.7 | 167.4 | 94.6 | 86.1 | 23.7 |
| Izod Impact (kJ/m) | 76 | 69 | 76 | 97 | 139 |
| IZOD DV (J/m) | 2 | 7 | 7 | 3 | 7 |

Comonomer Content

Figure 1:
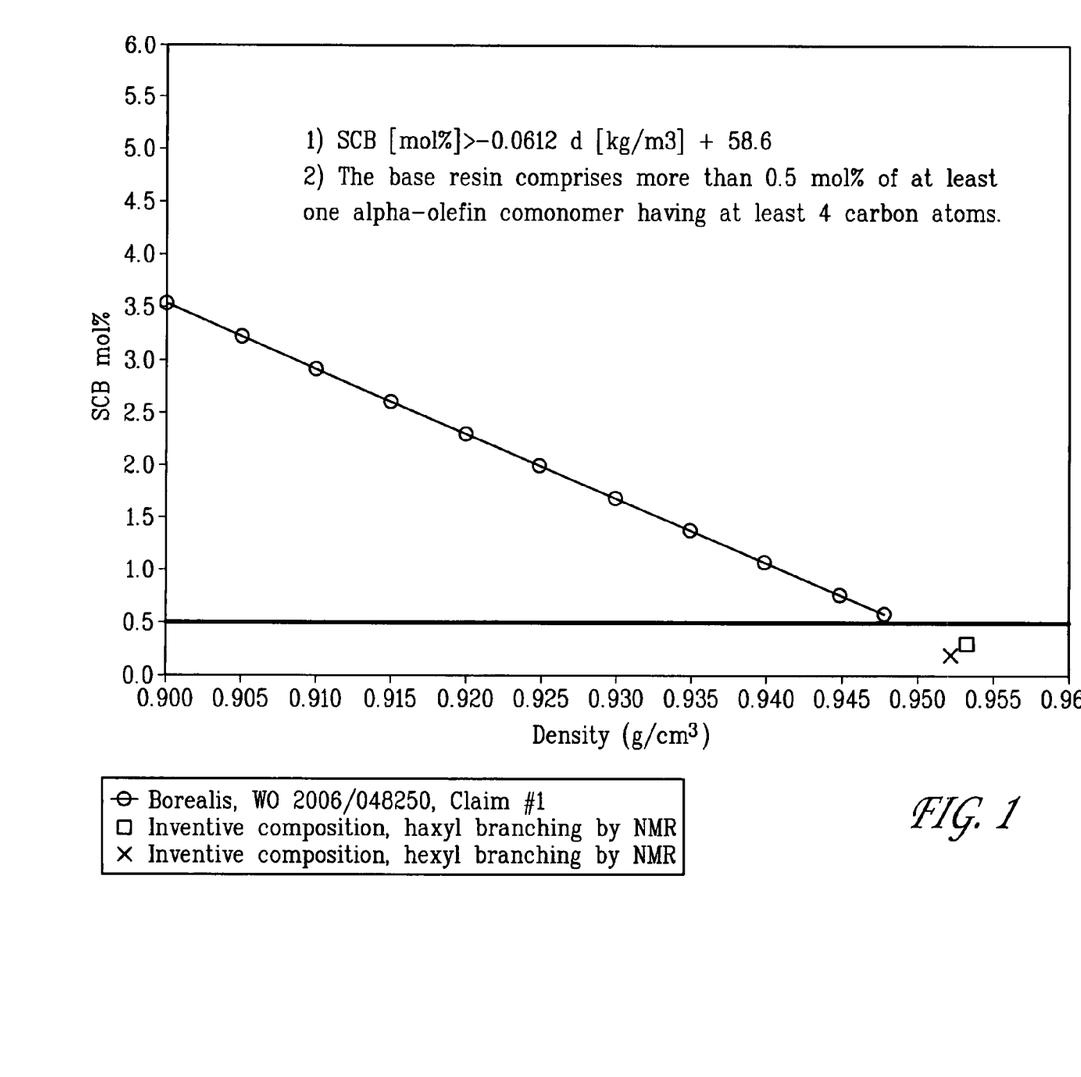
FIG. 1 shows the relationship between the comonomer content (mol %) and density for polyethylene compositions of the current invention.

As shown in FIG. 1, the polyethylene compositions PS-78278 and PS-78302 do not satisfy equation: comonomer mol %>−0.0612 d [kg/m$^3$]+58.6 under conditions in which the comonomer content (for comonomers of at least 4 carbon atoms) is more than 0.5 mol %, which is a property of the blends taught in WO 2006/048250. The comonomer content in FIG. 1 was determined by C$^{13}$ NMR, but if FTIR methods are employed a comonomer content of less than 0.5 mol % is also observed for PS-78278 and PS-78302.

Shear Thinning Index

Figure 2:
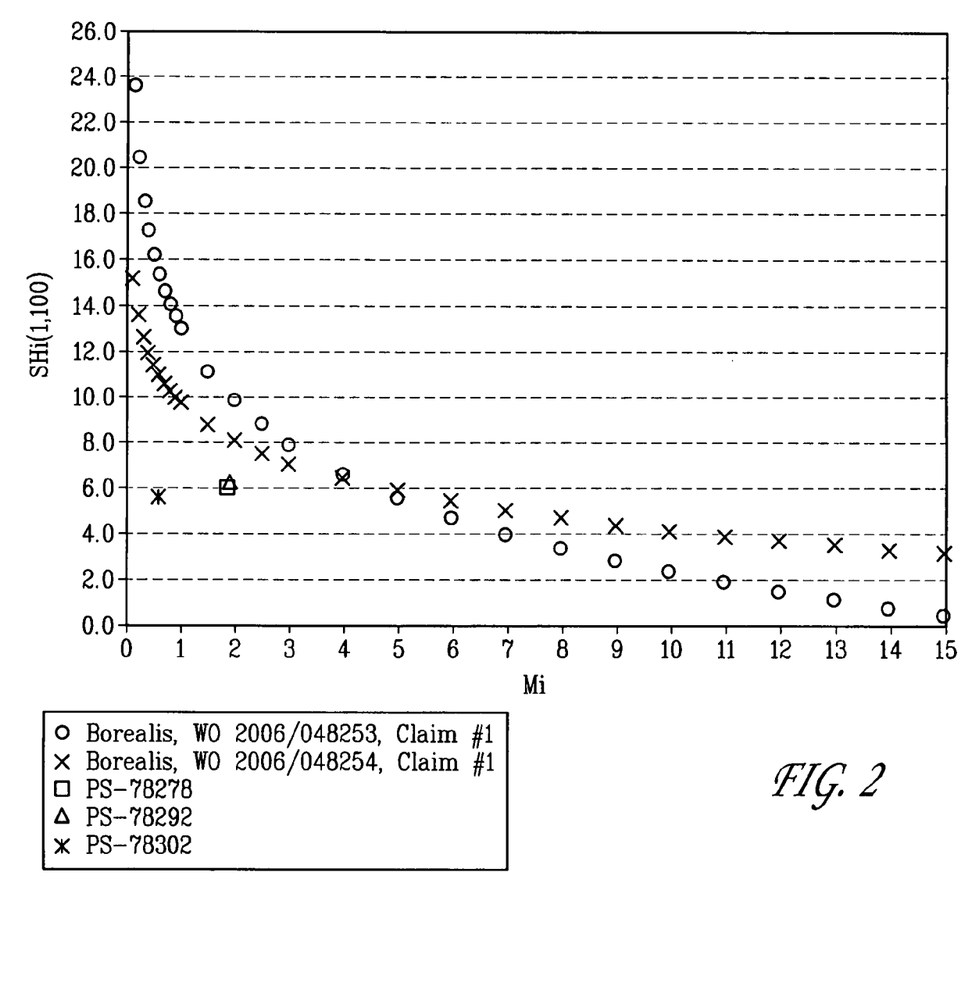
FIG. 2 shows the relationship between the shear thinning index $SHI_{(1,100)}$ and the melt index, $I_2$ of polyethylene compositions of the current invention.

As shown in FIG. 2, the polyethylene compositions, PS-78278 and PS-78302 do not satisfy the equation $SHI_{(1, 100)} \geq -10.58 \log I_2 + 12.94$, which is a property of the blends taught in WO 2006/048253 and WO 2006/048254.

Melt Index

The ratio of the melt index, $I_2$, of the second ethylene polymer to the calculated melt index, $I_5$, of the polyethylene compositions PS-78278 and PS-78302 is below 200. This is divergent from the teaching of WO/2006/048255, which discloses blends having a ratio of melt index, $I_2$, of a low molecular weight component to the melt index, $I_5$, of the overall polyethylene composition of more than 200.

The polyethylene compositions, PS-78278 and PS-78302 have a calculated melt index, $I_5$, of above 1.1 g/10 min and a ratio of melt index, $I_{21}$, of the polyethylene composition to the melt index, $I_5$, of the polyethylene composition of below 20 (i.e. $I_{21}/I_5 < 20$). This is divergent from the teaching of WO/2006/048259, which discloses blends having the properties: composition $I_5 = 0.5$ to 1.1 g/10 min; and composition $I_2$/composition $I_5 = 15$ to 28.

What is claimed is:

1. A closure comprising a bimodal polyethylene composition, said bimodal polyethylene composition comprising:
   (1) 10 to 70 wt % of a first ethylene polymer having a melt index, $I_2$, of less than 0.4 g/10 min; a molecular weight distribution, $M_w/M_n$, of less than 3.0; a CDBI>50 and a density of from 0.932 to 0.955 g/cm$^3$; and
   (2) 90 to 30 wt % of a second ethylene polymer having a melt index, $I_2$, of from 20 to 1000 g/10 min; a molecular weight distribution, $M_w/M_n$, of less than 3.0; a CDBI>50 and a density higher than the density of said first ethylene polymer, but less than 0.962 g/cm$^3$;

wherein the density of said second ethylene polymer is less than 0.035 g/cm$^3$ higher than the density of said first ethylene polymer; and wherein said polyethylene composition has a molecular weight distribution, $M_w/M_n$, of from 3 to 7; a density of more than 0.949 g/cm$^3$; a melt index of from 0.4 to 3 g/10 min and a comonomer content of less than 0.5 mol %.

2. The closure of claim 1, wherein said polyethylene composition has a molecular weight distribution, $M_w/M_n$, of from 4 to 7.

3. The closure of claim 1, wherein said polyethylene composition has melt index, $I_2$, of from 0.4 to 2 g/10 min.

4. The closure of claim 1, wherein the density of said second ethylene polymer is less than 0.030 g/cm$^3$ higher than the density of said first ethylene polymer.

5. The closure of claim 1, wherein the polyethylene composition has a hexane extractables level of less than 0.55 wt %.

6. The closure of claim 1, wherein the polyethylene composition comprises from 20 to 60 wt % of a first ethylene polymer and from 80 to 40 wt % of a second ethylene polymer.

7. The closure of claim 1, wherein the first and second ethylene polymers are copolymers of ethylene and 1-octene.

8. The closure of claim 1, wherein the closure is made by compression molding or injection molding.

9. A closure comprising a bimodal polyethylene composition, said polyethylene composition comprising:
   (1) 20 to 60 wt % of a first ethylene polymer having a melt index, $I_2$, of less than 0.4 g/10 min; a molecular weight distribution, $M_w/M_n$, of less than 3.0; a CDBI>50 and a density of from 0.932 to 0.955 g/cm$^3$; and
   (2) 80 to 40 wt % of a second ethylene polymer having a melt index, $I_2$, of from 20 to 1000 g/10 min; a molecular weight distribution, $M_w/M_n$, of less than 3.0; a CDBI>50 and a density higher than the density of said first ethylene polymer, but less than 0.962 g/cm$^3$;

wherein the density of said second ethylene polymer is less than 0.035 g/cm$^3$ higher than the density of said first ethylene polymer; and wherein said composition has a molecular weight distribution of from 3 to 7, a density of more than 0.949 g/cm$^3$, a melt index of from 0.4 to 3 g/10 min and a comonomer content of less than 0.5 mol %; and wherein said polyethylene composition is prepared by contacting ethylene and 1-octene under solution polymerization conditions in at least two polymerization reactors.

10. A polyethylene composition comprising:
(1) 20-60 wt % of a first ethylene polymer having a $M_W$ of at least 110000; a molecular weight distribution, $M_w/M_n$, of less than 2.5 and a density of from 0.932 to 0.955 g/cm$^3$; and
(2) 80-40 wt % of a second ethylene polymer having a $M_W$ of at most 45000; a molecular weight distribution, $M_w/M_n$, of less than 2.5 and a density higher than the density of said first ethylene polymer, but less than 0.962 g/cm$^3$;

wherein the density of said second ethylene polymer is less than 0.035 g/cm$^3$ higher than the density of said first ethylene polymer; and wherein said polyethylene composition has a hexane extractables level of less than 0.55 wt %; a shear viscosity at $10^4$ s$^{-1}$ (230° C.) of less than 50 (Pa·s) and satisfies the equations:
  a) the ratio of $I_2$ of the second ethylene polymer/$I_2$ of the first ethylene polymer>50/1; and
  b) the ratio of $I_2$ of the second ethylene polymer/$I_2$ of the composition is from 6 to 2500.

11. The polyethylene composition of claim 10, wherein said composition has a density of more than 0.949 g/cm$^3$.

12. The polyethylene composition of claim 11, wherein said composition has a molecular weight distribution, $M_w/M_n$, of 3 to 7.

13. The polyethylene composition of claim 12, wherein the composition has a melt index, $I_2$, of 0.4 to 3 g/10 min.

14. The polyethylene composition of claim 13, wherein the first and second ethylene polymers are copolymers of ethylene and 1-octene.

15. A compression molded or injection molded closure for bottles comprising the polyethylene composition of any one of claims 10-14.

16. A process to prepare a bimodal polyethylene composition, wherein the composition comprises:
(1) 20 to 60 wt % of a first ethylene polymer having a melt index, $I_2$, of less than 0.4 g/10 min; a molecular weight distribution, $M_w/M_n$, of less than 3.0; a CDBI>50 and a density of from 0.932 to 0.955 g/cm$^3$; and
(2) 80 to 40 wt % of a second ethylene polymer having a melt index, $I_2$, of from 20 to 1000 g/10 min; a molecular weight distribution, $M_w/M_n$, of less than 3.0; a CDBI>50 and a density higher than the density of said first ethylene polymer, but less than 0.962 g/cm$^3$;

wherein the density of said second ethylene polymer is less than 0.035 g/cm$^3$ higher than the density of said first ethylene polymer; and wherein said composition has a molecular weight distribution of from 3 to 7; a density of more than 0.949 g/cm$^3$; a melt index of from 0.4 to 3 g/10 min and a comonomer content of less than 0.5 mol %; and said process comprising contacting at least one single site polymerization catalyst system with ethylene and at least one comonomer under solution polymerization conditions in at least two polymerization reactors.

17. The process of claim 16, wherein the comonomer is 1-octene.

18. A process for preparing the closure of claim 1 or 9, wherein the process comprises at least one compression molding or injection molding step.

* * * * *